United States Patent [19]
Yanagisawa

[11] Patent Number: 5,867,406
[45] Date of Patent: Feb. 2, 1999

[54] DOCKING DEVICE FOR A PORTABLE COMPUTER AND A METHOD FOR DOCKING A PORTABLE COMPUTER TO THE DOCKING DEVICE

[75] Inventor: Takashi Yanagisawa, Yokohama, Japan

[73] Assignee: International Business Machines Corp., Armonk, N.Y.

[21] Appl. No.: 416,398

[22] Filed: Apr. 6, 1995

[30] Foreign Application Priority Data

Jun. 16, 1994 [JP] Japan ..................................... 6-134124

[51] Int. Cl.⁶ ....................................................... G06F 7/50
[52] U.S. Cl. ...................... 364/708.1; 361/683; 361/729; 361/733
[58] Field of Search ................ 364/708.1; 361/680–686, 361/728–733; 395/281, 283, 500, 800

[56] References Cited

U.S. PATENT DOCUMENTS

| | | | |
|---|---|---|---|
| 5,030,128 | 7/1991 | Herron et al. | 439/372 |
| 5,123,092 | 6/1992 | Buxton et al. | 395/250 |
| 5,265,238 | 11/1993 | Canova, Jr. et al. | 395/500 |
| 5,323,291 | 6/1994 | Boyle et al. | 361/683 |
| 5,377,357 | 12/1994 | Nishigaki et al. | 395/800 |
| 5,430,883 | 7/1995 | Horiuchi | 395/750 |
| 5,463,742 | 10/1995 | Kobayashi | 395/281 |
| 5,473,499 | 12/1995 | Weir | 361/58 |
| 5,526,493 | 6/1996 | Shu | 395/281 |

*Primary Examiner*—Emmanuel L. Moise
*Attorney, Agent, or Firm*—Andrew J. Dillon

[57] ABSTRACT

A docking device for a portable computer includes a body adapted to receive a portable computer. The body encloses a number of electronic components adapted to be connected to a portable computer via a number of signal lines. A connector is provided in the body which mechanically connects the number of signal lines within the body to a corresponding number of signal lines within the portable computer. The docking device also includes a signal connection means interposed between the portable computer and the electronic components for selectively electrically interconnecting the particular ones of the signal lines within the body to corresponding signal lines among the number of signal lines within the portable computer in response to an operating state of said portable computer. A preferred embodiment of the docking device further includes a control means for controlling the selective electrical interconnection of the particular ones of the number of signal lines by the signal connection means. In this preferred embodiment, the control means electrically interconnects the particular ones of the number of signal lines within the body to corresponding signal lines within the portable computer in response to an acknowledgment by the portable computer of a request by the control means to electrically interconnect the particular ones of the number of signal lines.

17 Claims, 15 Drawing Sheets

PRIOR ART

PRIOR ART

PRIOR ART

DOCKING DEVICE FOR A PORTABLE COMPUTER AND A METHOD FOR DOCKING A PORTABLE COMPUTER TO THE DOCKING DEVICE

BACKGROUND OF THE INVENTION

1. Technical Field

The present invention relates in general to an improved method and system for data processing and in particular to a docking device to which a portable computer can be docked and a method for controlling the docking device. Still more particularly, the present invention relates to an improved docking device for a portable computer and a method for controlling the docking device which enables the docking and undocking of the portable computer and the docking device when the portable computer is operating at either an ordinary or a reduced power level.

2. Description of the Related Art

A. Portable Computer

With recent technological innovations, small and light-weight portable personal computers (or portable computers) have become widely available. With reference now to FIG. 17, there is illustrated an example of a conventional portable computer. As illustrated, a portable computer 1000 comprises a thin main body 1010, and a cover 1020 which is connected so as to be freely opened and closed with respect to the main body 1010. The cover 1020 has a pair of projections 1021 formed in the lower end thereof, whereby the cover 1020 is hinged-connected to the main body 1010. Within cover 1020, a liquid crystal display (LCD) 1022 is disposed as the display means of portable computer 1000. Further, on the top of the main body 1010, a keyboard 1011 is disposed as the input means of portable computer 1000.

Referring now to FIG. 18, the interior of the main body 1010 is depicted. The inside of the main body 1010, which is exposed by lifting keyboard 1011, is partitioned into a front section and a back section by a partition 1012. In the back section hidden by the partition 1012, the circuit board (not shown) of the computer including a CPU, ROM, RAM, system bus, and the like is accommodated. In addition, in the space in front of the partition 1012, peripheral devices such as a floppy disk drive (FDD) pack 1013, hard disk drive (HDD) pack 1014, and a battery pack 1015 are received in an removable manner.

B. Docking Device for a Portable Computer

For portable computers such as portable computer 1000, retaining portability limits the external storage and communication units which can be built in the computer. Further, when a portable computer is used on a desk top, it is very cumbersome to separately connect various cables such as the printer cable, monitor cable, and communication cable and an AC adapter. In addition, because the size of the portable computer is small, the size and number of devices which can be accommodated are limited. Thus, a docking device for a portable computer, also called an "expansion unit" or a "docking station," which support additional capabilities of the portable computer (hereinafter, simply referred to as a "docking device", whereas a portable computer to be connected and used is also simply referred to as a "host") has already been developed and is publicly available.

With reference to FIG. 19, there is illustrated a conventional docking device for a portable computer. Docking device 1100 comprises base body 1110 and a cover 1120. The base body 1110 has a support section 1111 on which the portable computer 1000 is mounted. On both sides of the support section 1111, guides 1112 are provided into which the portable computer is inserted. In the back of the support section 1110, a connector 1113 for connection of signals between the portable computer 1000 and docking device 1100 is provided. Referring now to FIG. 20, there is depicted an isometric view of the back of portable computer 1000. In the back of the main system body 1010, connector 1113 is provided for connection of signals between portable computer 1000 and the docking device 1100. As depicted in FIG. 21, portable computer 1000 slides across support section 1111 along the guides 1112 until portable computer 1000 and 1100 are docked by connection of connectors 1017 and 1113. Undocking is performed by following the foregoing procedure in reverse.

In addition to this application, for instance, in the Patent Application 3-273323, Patent Application No.3-294917, Patent Application No. 4-617, Patent Application No. 4-186411, Utility Model Application No. 3-119220, and Utility Model Application No. 3-127933, there are also described docking devices for a portable computer.

A docking device for a portable computer generally performs two major functions—port replication and bus expansion. The port replication function is achieved by providing an extension of the port signals of the portable computer in the docking device. That is, if the above-described various cables are previously connected to the individual ports of the docking device, the user can use a printer, monitor, etc., simply by docking the portable computer with the docking device, thereby eliminating the cumbersome work of separately connecting a cable for each device. In addition, the number of ports which are available on the docking device is usually larger than the number provide on the portable computer, consequently enabling more devices to be connected to the portable computer.

The bus expansion function is achieved by the docking device having an extension of the system bus of the portable computer. Since the portable computer is compact, the number of devices which can be directly connected to the system bus (for example, an ISA bus) is relatively small. Accordingly, by connecting desired devices to the system bus extension within the docking device, the portable computer can use additional devices. The devices can include, for example, an add-on HDD (for example, an IDE_HDD), SCSI device, and a PCMCIA device. The SCSI device and PCMCIA device are devices which conform to the Small Computer System Interface (SCSI) standard and Personal Computer Memory Card Interface Association (PCMCIA) standard, respectively, (in brief, it is to be understood that IDE, PCMCIA, and SCSI are standards for connection of devices to an ISA bus), which are usually connected to the system bus through a SCSI controller and a PCMCIA controller. Accordingly, if the SCSI controller and the PCMCIA controller are provided on the system bus extension within the docking device, devices are easily added on. Thus, the main role of the docking device for a portable computer would be to supplement the functions of the portable computer which are insufficient because of its compact structure.

C. Docking of a Portable Computer With the Docking Device

The connection of a docking device for a portable computer with a portable computer is usually performed by a single connector which includes all of the port signals, bus signals, control signals and the like, rather than by discrete connectors provided for the respective cables and devices. The reason for this is that it would be difficult, if not impossible, to manufacture a docking device which enabled mechanical alignment between a plurality of connectors and mechanical alignment between each pin of each connector. For example, in the above described Patent Application No. 4-291028, the docking station and the portable computer are docked utilizing a single connector formed by bundling all of the signals, as shown in FIGS. 19 and 20. Similarly, Patent Application No. 3-273323, Patent Application No. 3-294917, Patent Application No. 4-617, Patent Application No. 4-186411, Utility Model Application No. 3-119220, and Utility Model Application No. 3-127933, in accordance with the drawings attached to each specification, describe a docking device and a portable computer which are docked by a single connector.

If a docking device and a portable computer are mechanically connected by a single connector containing all of the required signals, as described above, several technical problems remain. One of the problems is to electrically connect both systems smoothly when the portable computer is in a power-on state or a power save mode such as suspend, in other words, an active state in which the power supply to the portable computer is not completely shut off.

Those skilled in the art will appreciate from the above description that the connector for connecting the portable computer and docking device includes signals having various characteristics. These signals can be classified into two categories. One category comprises port signals for connection to a keyboard, mouse and CRT, and the other category includes bus signals such as the system bus, PCMCIA control signal, IDE_HDD control signal, and FDD signal. One criterion for such classification is that the port signals can be connected or disconnected even in a power-on state (namely an active state), whereas the bus signals cannot be connected or disconnected when active. The reason for this distinction is described below.

A port signal is usually communicated to the system bus through a device controller (for instance, a keyboard controller for the keyboard, and a video controller for CRT). These controllers, if simplified, consist of an interface circuit for communication with the system bus, and a driver circuit (driver) for activating the port signals on the local side, as shown in FIG. 22. The interface circuit is not always in an operative state, but is adapted to be operated only by signals from the local side. Consequently, the interface circuit effectively acts as a buffer, which prevents the noise generated at the time of port signal connection propagating to the system bus. In other words, the port signals can be connected or disconnected when active. On the other hand, the system bus includes bus signals which are always in an operative state (a state in which a signal is present), such as the data and clock lines. Accordingly, if active connection or disconnection of the system bus is attempted, the normal waveforms of the bus signals are disturbed, and, as a result, the hardware can be damaged, the system can shut down, or data in transmission can be corrupted, causing the system to crash. In addition, the IDE_HDD control signal, PCMCIA control signal, FDD signal, and LCD panel control signal, cannot be connected or disconnected with power on since they always include a signal in an operative state and may conflict with existing resources within the host. Moreover, from a software perspective, the system configuration of the docking device may conflict with the resources already installed on the host, which would result in a malfunction. Thus, the active connection or disconnection of bus signals can create both hardware and software malfunctions.

Accordingly, in conventional systems, the docking of a portable computer and docking device is permitted only when the portable computer is powered off and the system is not installed. Even when operating in a power management mode which extends the operating time of the self-contained battery, the portable computer could not be docked with the docking device since the power is not completely shut off. In addition, in case a user attempted docking despite the portable computer being powered-on, many conventional systems include a fail safe for which the operations are described below and illustrated in Table 1.

(1) If the docking of the portable computer with the docking device is attempted in an ordinary operation state or standby state (in other words, a power-on state), the power supply of the portable computer is forcibly shut down to prevent damage to the docking device hardware.

(2) If docking is attempted in a suspend state, the docking device inhibits operation of the portable computer from being resumed after docking. In addition, the docking device issues a warning (usually a beep) to warn that such docking is not allowed (an operation error).

(3) If the docking is tried in a power-off state, the usual operation is performed after the docking when the power is turned on (a normal docking operation).

TABLE 1

| State of host before docking | Operation in docking |
| --- | --- |
| Ordinary operation state or Standby mode | Forcibly shut down the power supply of the host to prevent hardware damage to the equipment. |
| Suspend mode | After docking, inhibit the host from being resumed, and issue a warning (beep) to indicate disallowing of docking. |
| Power off | After docking, perform an ordinary operation with the power being turned on. |

In summary, the portable computer and the docking device could not be smoothly docked when the portable computer was in a power-on state.

Incidentally, standby and suspend are part of the power management (PM) operations which have recently become available on portable computers. The standby mode is a mode in which the power is shut down only for particular devices such as a liquid crystal display (LCD), while the system bus remains active. The suspend mode is a mode in which the system bus is inactive and the power for components other than the main memory is shut down after the data necessary for resuming a task is saved in the main memory. To return from the suspend mode to the ordinary operation state is called resume. Such power management operations are performed, for instance, by a program called PM code (loaded into the memory when the system is initiated).

However, among the devices connected through the signal port having the capability of active connection or disconnection, there are some which the user desires to promptly use while the portable computer is in an operating state. For instance, a document of a program being edited on the portable computer may be printed at once by the printer connected to the docking device. Also, a coordinate input using the mouse connected to the docking device may be desired. Even in the event that an operation which the user desires to be immediately performed occurs, if the user must perform a lengthy procedure that requires temporarily turning off the power of the portable computer before making connection, the user may perceive that the docking device is difficult to use.

SUMMARY OF THE INVENTION

It is therefore one object of the present invention to provide an improved method and system for data processing.

It is another object of the present invention to provide an improved docking device for a portable computer and a method for controlling the docking device.

It is yet another object of the present invention to provide an improved docking device for a portable computer and a control method thereof which enables the docking and undocking of the portable computer and the docking device when the portable computer is operating at an ordinary or reduced power level.

The foregoing objects are achieved as is now described. A docking device for a portable computer is disclosed which includes a body adapted to receive a portable computer that encloses a number of electronic components adapted to be connected to a portable computer via a number of signal lines. A connector is provided in the body which mechanically connects the number of signal lines within the body to a corresponding number of signal lines within the portable computer. The docking device also includes a signal connection means interposed between the portable computer and the electronic components for selectively electrically interconnecting the particular ones of the signal lines within the body to corresponding signal lines among the number of signal lines within the portable computer in response to an operating state of said portable computer. A preferred embodiment of the docking device further includes a control means for controlling the selective electrical interconnection of the particular ones of the number of signal lines by the signal connection means. In this preferred embodiment, the control means electrically interconnects the particular ones of the number of signal lines within the body to corresponding signal lines within the portable computer in response to an acknowledgment by the portable computer of a request by the control means to electrically interconnect the particular ones of the number of signal lines.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

A. System Hardware Configuration

Figure 1:
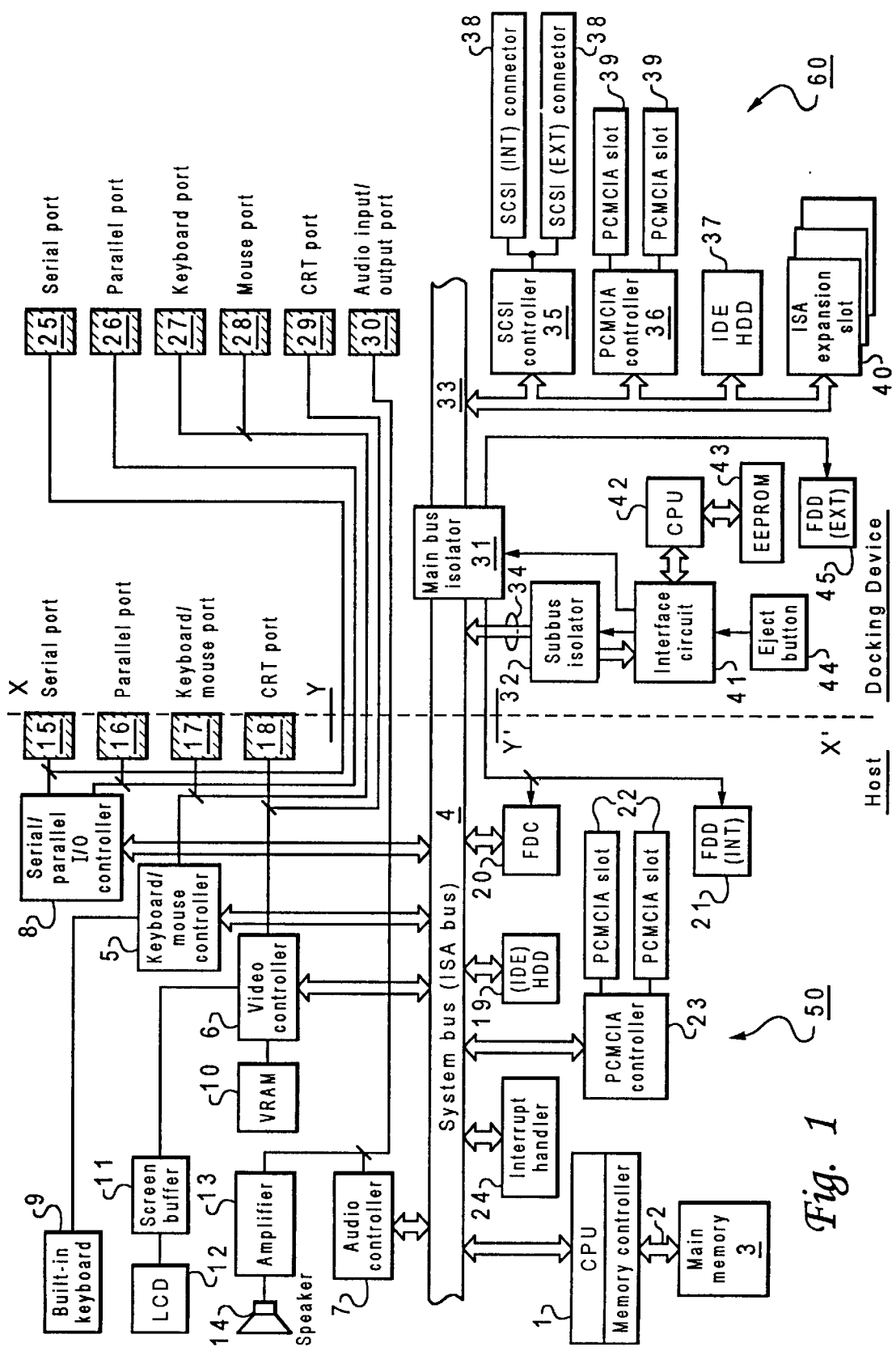
FIG. 1 illustrates a preferred embodiment of the hardware configuration of a portable computer and the docking device for a portable computer of the present invention and, more particularly, illustrates a hardware configuration featuring bus signals and port signals.

With reference now to the figures, and in particular with reference to FIG. 1, there is illustrated a block diagram of a preferred embodiment of the hardware configuration of a docking device for a portable computer and a portable computer according to the present invention. However, those skilled in the art will appreciate that details not required for an understanding of the present invention have been omitted for simplicity. In FIG. 1, the section depicted to the left of a dashed line X—X' shows the hardware configuration of the portable computer (host) 50.

Figure 2:
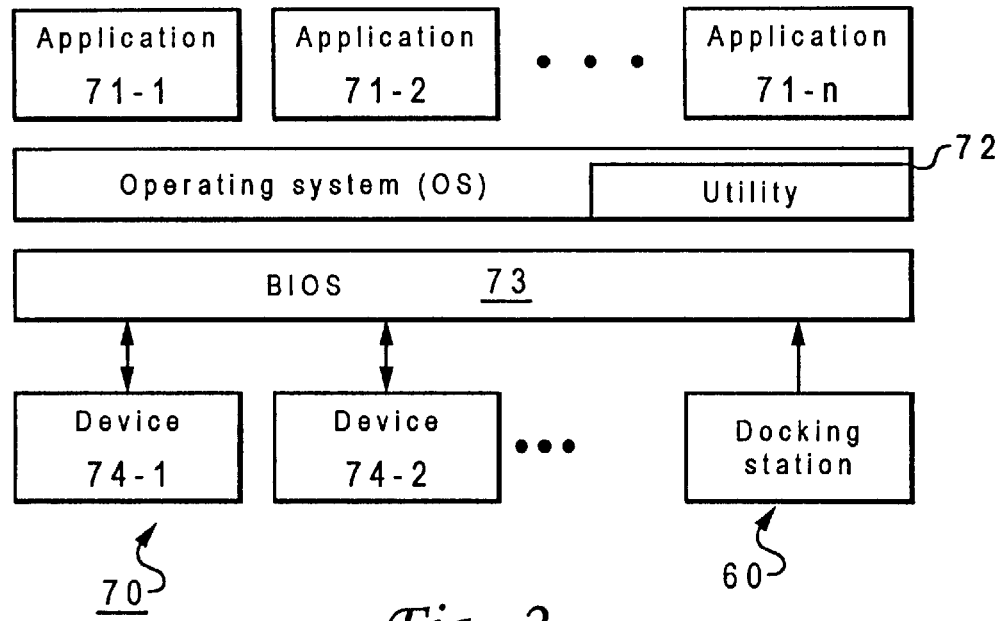
FIG. 2 depicts the software configuration of the portable computer illustrated in FIG. 1.

CPU 1 controls the operation of portable computer 50. In the depicted embodiment, CPU 1 contains a memory controller and communicates with main memory 3 through memory bus 2. The main memory 3 is typically a writable memory such as DRAM. Basic Input/Output System (BIOS)

and an operating system (OS) are loaded from ROM (not shown) or external storage (described later) into the main memory 3, when the system is initialized. Various applications are loaded to main memory 3 on user demand. In addition, main memory 3 is adapted to temporarily store working data when the CPU 1 executes a task. FIG. 2 illustrates a software configuration 70 of portable computer 50. Various applications 71 are executed under the support of an OS/utility 72. The hardware operation for various devices (including the docking device) 74 is not directly carried out by the applications 71 or OS 72, but supported by BIOS 73.

Returning to FIG. 1, CPU 1 also connects for communication with a keyboard/mouse controller 5, a video controller 6, an audio controller 7 and a serial/parallel I/O controller 8 through a system bus 4. Although system bus 4 is an ISA bus in this preferred embodiment, those skilled in the art will appreciate that a microchannel (MC) bus or PCI bus may also be utilized. Keyboard/mouse controller 5 receives input signals from a mouse and a keyboard. The mouse or keyboard may be those which are externally connected through a keyboard/mouse port 17, or may be a keyboard 9 built into the portable computer 50. The video controller 6 provides control for displaying image data according to the content of a VRAM 10. Although the portable computer 50 includes a liquid crystal display (LCD) 12 connected via a screen buffer 11, an additional CRT display (not shown) may optionally be connected via a CRT (analog video signal) port 18. The audio controller 7 processes the input/output of an audio signal. The audio signal is output by a built-in speaker 14 via an amplifier circuit 13, or input or output to an external audio device (not shown) via an audio input/output port 30. The serial/parallel I/O controller 8 controls timing and the like during data transfer between various I/O devices connected via a serial port 15 or a parallel port 16. Generally, a device transferring data on a bit-by-bit basis, such as a modem, is attached to the serial port 15 and a device transferring data on a byte-by-byte basis, such as a dot matrix printer, is attached to the parallel port 16.

Figure 20:
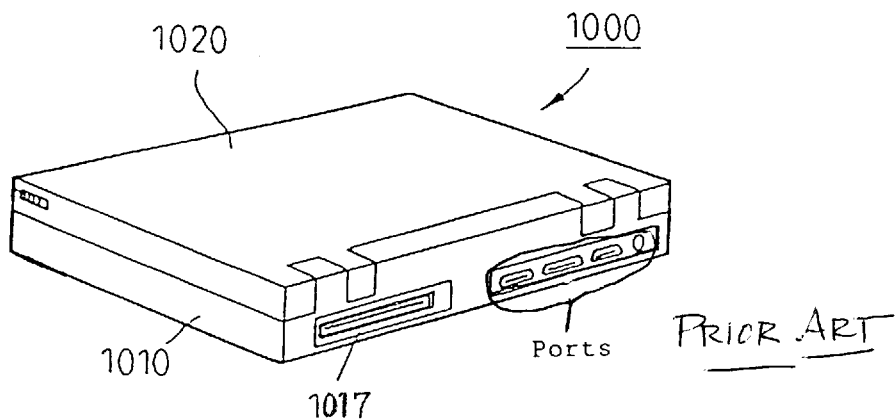
FIG. 20 depicts a perspective view of the back of a conventional portable computer.
Figure 21:
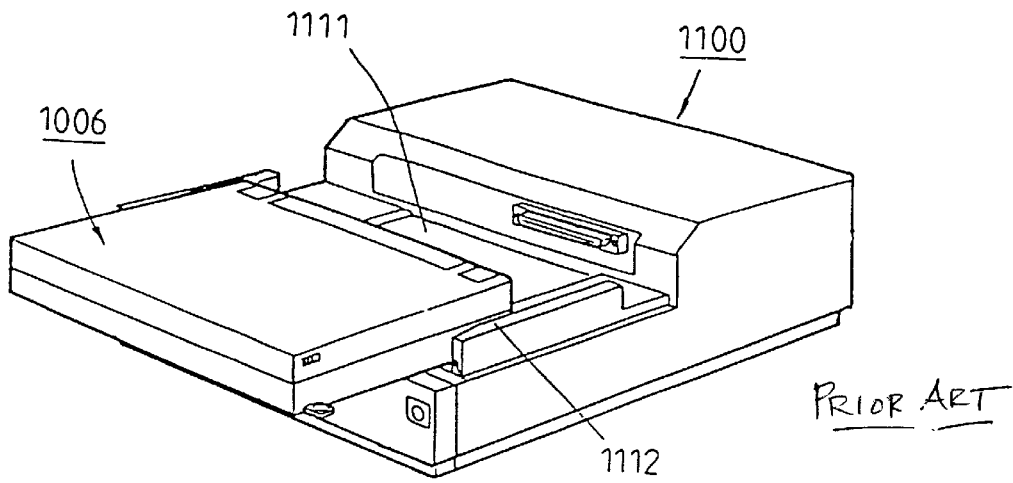
FIG. 21 illustrates docking or undocking the conventional portable computer from the conventional docking device.
Figure 22:
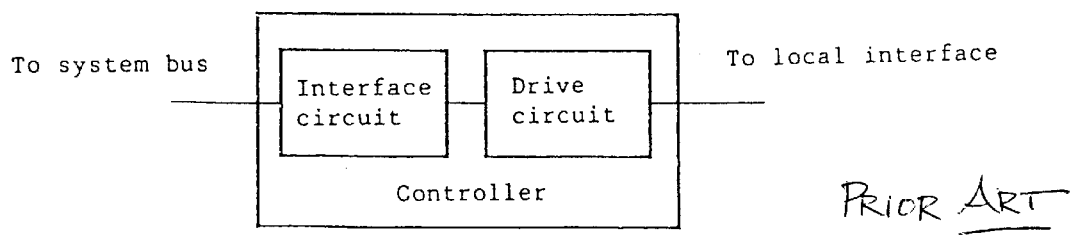
FIG. 22 schematically depicts the construction of each device controller interposed between the system bus and the port signals within a conventional portable computer.

Various ports such as the above-described serial port 15, parallel port 16, keyboard/mouse port 17, and analog video port 18 are typically separately disposed on the back of the portable computer 50 as is illustrated with respect to portable computer 1000 in FIG. 20. When docked with docking device 60 in FIG. 1, these ports are closed by contact with the back of the support section of the docking device 60 to prevent a cable from being connected to the ports. The various port signals branch en route to their respective ports and are assigned to the pins of a connector Y—Y' for connection with the docking device, as described later.

Hard disk drive (HDD) and a floppy disk drive (FDD) are mounted on the portable computer 50 as external storage. In this embodiment, as the HDD, an IDE_HDD 19 is used which can be connected using some signals of the ISA bus. A FDD 21 is controlled by a floppy disk controller (FDC) 20 which directly communicates with the system bus 4. Slots 22 are provided in the portable computer 50 for storing PCMCIA cards. PCMCIA controller 23 is provided for data exchange between the mounted cards and the system bus 4.

Finally, portable computer 50 includes an interrupt handler 24. The interrupt handler 24 continuously monitors the system bus 4 (more particularly, EVENT# of the bus signals) and detects the occurrence of a software interrupt also referred to as SMI (System Management Interrupt). In the depicted embodiment of the present invention, EVENT# in state ACTIVE LOW corresponds to a software interrupt in any device (including docking device 60) which notifies BIOS 73 of the interrupt, as described later.

Referring again to FIG. 1, the portion depicted to the right of dashed line X—X' comprises docking device 60. The docking device 60 communicates with host 50 by port signals and bus signals crossing Y—Y'. These port and bus signals are assigned to each pin of a connector which mechanically connects the port and bus signals by docking host 50 and docking device 60, as mentioned above.

The port signals outgoing from the serial parallel I/O controller 8, keyboard/mouse controller 5, video controller 6 and audio controller 7 from portable computer 50 branch to a serial port 25, parallel port 26, keyboard port 27, mouse port 28, CRT port 29, and audio input/output port 30 within the docking device side. That is, it is understood that the ports 25–30 within docking device 60 function as ports 15-18 within portable computer 50 or expand the number of such ports. The user may connect various devices such as a modem and a printer to ports 25–30 before docking host 50, as additional devices are required.

System bus 4 within host 50 branches to a main bus 33 and a subbus 34 within docking device 60 just after the connector Y—Y'. Main bus 33 comprises the signals which cannot be connected or disconnected while active, such as the IDE HDD control signal, PCMCIA control signal, FDD signal, and LCD panel control signal, in addition to signals within system bus 4. SCSI controller 35, a PCMCIA controller 36, an IDE_HDD (externally connected HDD) 37, and ISA expansion slots 40 are connected to main bus 33 via a main bus isolator 31. The SCSI controller 35 is a controller for allowing data exchange between an SCSI device and the system bus, and, on its local side, there are disposed a number of SCSI connectors (including both built-in and expansion types) 38 for connecting SCSI devices. PCMCIA controller 36 is a controller which allows data to be exchanged between a PCMCIA device and system bus 4. On the local side of PCMCIA controller 36, there are disposed slots 39 for connecting PCMCIA cards. Those skilled in the art will recognize that by connecting various devices and cards to connectors 38 and slots 39, the peripheral environment of portable computer 50 can be expanded.

Main bus isolator 31 is used to electrically isolate the system bus 4 and the main bus 33 even after the connector Y—Y' is mechanically coupled. For instance, even if host 50 is in a power-on state and main bus 33 is in a power-off state when host 50 and docking device 60 are mechanically connected, the various devices 35–40 connected to the main bus 33 are protected from hardware damage because main bus isolator 31 electrically isolates main bus 33 and system bus 4 from each other. The docking/undocking operation of the main bus isolator 31 is performed via an interface circuit 41 by a CPU 42, which will be described below.

Subbus 34 comprises some bus signals of system bus 4, such as I/O_Read# and I/O_Write#, and a docking control signal which will be described later. Subbus 34 communicates with interface circuit 41 and CPU 42 via a subbus isolator 32. The above-mentioned signals included in subbus 34 are signals which cannot conflict with the resources host 50. Interface circuit 41 outputs data only when an I/O access is performed and remains in a receive state except for such I/O accesses, so that interface circuit 41 does not disturb the signal waveform of system bus 4. Accordingly, the subbus 34 can be coupled or decoupled when portable computer 50 is active, unlike the main bus 33. The subbus isolator 32 electrically isolates system bus 4 and subbus 34 even after the connector Y—Y' is mechanically coupled. For instance, if host 50 in a power-off state and subbus 34 in a power-on state are mechanically connected, hardware damage within host 50 is prevented because subbus isolator 32 electrically isolates the two from each other. The docking/undocking operation by the subbus isolator 32 is performed via interface circuit 41 by CPU 42, which will be described below.

CPU 42 controls the operation of the entire docking device 60, but in the depicted embodiment, the control of the docking/undocking operation of bus isolators 31 and 32 is especially critical. CPU 42 causes the interface circuit 41 to perform the operations of connecting buses 33 and 34 to system bus 4. In CPU 42, a nonvolatile writable memory such as an EEPROM 43 or a CMOS chip powered by a reserve battery is additionally provided, and the system configuration of the docking device 60 is written to the additional memory 43.

Interface circuit 41 contains a plurality of registers such as an output register, input register, and control register. The output register is used to write the status or data to be reported to host 50 by docking device 60 and, more particularly, to the CPU 42. The input register is used to write the command or data to be sent to docking device 60 by host 50. The control register consists of plurality of bit flags such as IBF (Input Buffer Full), OBF (Output Buffer Full), and a busy flag. The IBF is set to 1 when host 50 writes a command or data to the input register and set to 0 when CPU 42 within docking device 60 reads the command or data in response to an interrupt generated by setting IBF. The OBF is set when CPU 42 writes a status or the like to the output register and reset when host 50 reads the output register in response to detecting the setting of the OBF when polling. The busy flag is a flag which indicates that CPU 42 is processing a task. While the busy flag is set, no command from host 50 is accepted. Further, the interface circuit 41 can issue an SMI to host 50 and CPU 42. Input to the interface circuit 41 is an eject signal for demanding the undocking of systems 50 and 60. The eject signal is generated when the user presses an eject button 44 disposed in the case of docking device 60 or by software executing within host 50.

FDC 20 within host 50 also communicates with the externally connected FDD 45 within docking device 60. The signals for FDC 20 to communicate with FDD 21 and 45 include those shared by both FDDs 21 and 45, such as data lines and clock lines, and those dedicated to each of FDD 21 and 45, such as motor enable and drive select. The data line and clock line cannot be connected or disconnected when active for reasons similar to those for the bus signal. Thus, in this embodiment, FDC 20 communicates with FDD 45 via main bus isolator 31.

B. Power Supply Mechanism of the Portable Computer and the Docking Device

Figure 3:
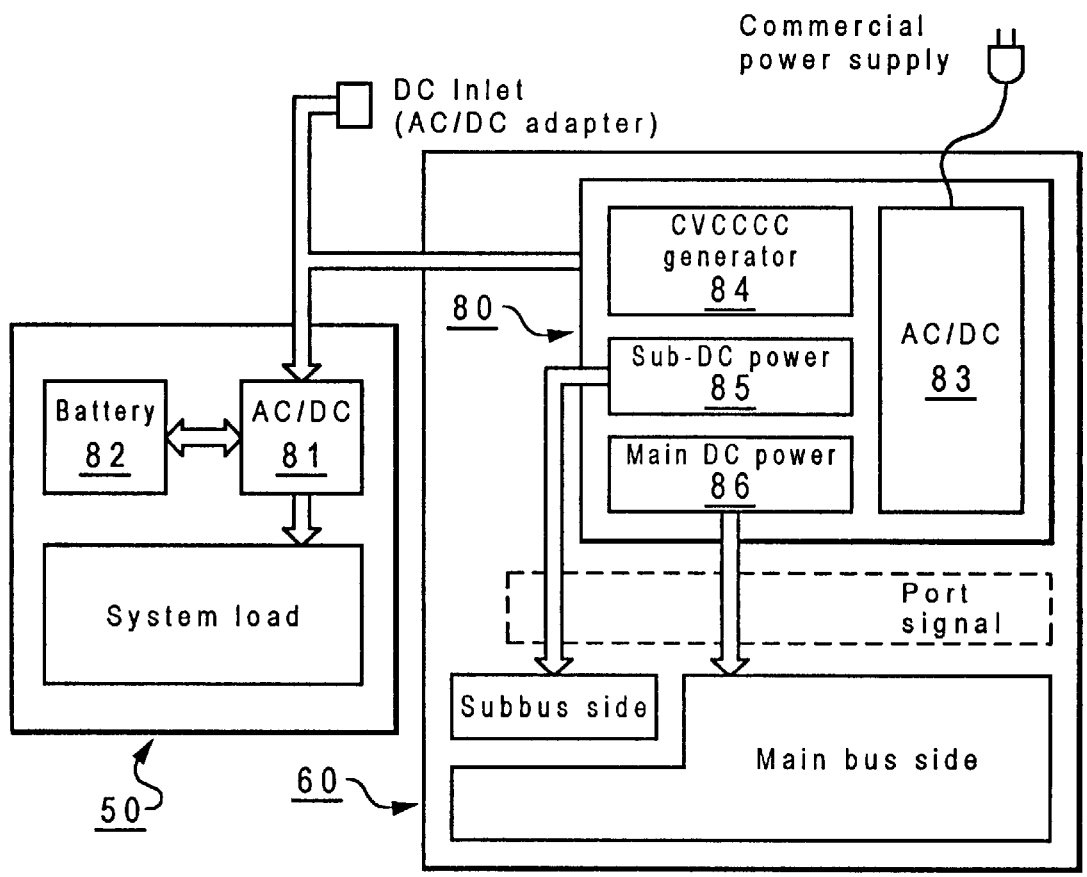
FIG. 3 illustrates a preferred embodiment of the power supply system of the portable computer and the docking device for a portable computer of the present invention.

With reference now to FIG. 3, there is illustrated the hardware configuration of the power systems of host 50 and docking device 60. Power to system load 87 of portable computer 50 is supplied from a commercial power supply via an AC/DC adapter (not shown) and an AC/DC converter 81 when it is in a stand-alone state or from a built-in rechargeable battery 82 (for instance, a Ni-MH or Ni-Cd battery). In addition, power is supplied from docking device 60 when docked with the docking device 60, as is explained below.

Power for the docking device 60 is supplied only from a commercial power supply. A power supply adapter 80 connected to the commercial power supply through an outlet has an AC/DC converter 83, a CVCPCC (constant voltage, constant power, constant current) generator 84, a sub-DC power supply 85, and a main DC power supply 86. The AC/DC converter 83 is used to convert the commercial power supply to a direct current. The CVCPCC generator 84 is a circuit for generating power with a volt-ampere characteristic of constant voltage, constant power, and constant current and sending the power to the host 50. The characteristic of CVCPCC generator 84 is only for correspondence to the characteristic of battery 82 contained in portable computer 50 and is not restrictive. For instance, generator 84 may be CVCC.

Sub-DC power supply 85 is used to convert the DC current from the AC/DC converter 83 to a voltage and to supply it to interface circuit 41 and CPU 42 coupled to subbus 34. Sub-DC power supply 85 supplies power to subbus 34 whenever the docking device 60 is supplied with power from the commercial power supply, thereby always enabling docking or undocking by the interface circuit 41 and the CPU 42. Since subbus 34 is always in a power-on (hot) state, the subbus isolator 32 electrically isolates both systems 50 and 60 to prevent hardware host 50 due to direct docking of host 50 while in a power-off (cold) state.

Main DC power supply 86 is used to convert the DC current from the AC/DC converter 83 into a voltage and to supply the voltage to the various devices coupled to main bus 33, such as SCSI controller 35, PCMCIA controller 36, and IDE_HDD 37. In this embodiment, in response to powering-on docked host 50, or the docking of host 50 while in a power-on state, which are detected by the signals DOCKED# and PWR_ON#, respectively, main DC power supply 86 starts to supply power to the main bus 33. As will be appreciated by those skilled in the art, lines which transmit signals such as serial port, parallel port, keyboard, and mouse port signals are only an extension of the lines within host 50 and need not be supplied with power.

C. Connector Pin Assignment

Figure 4:
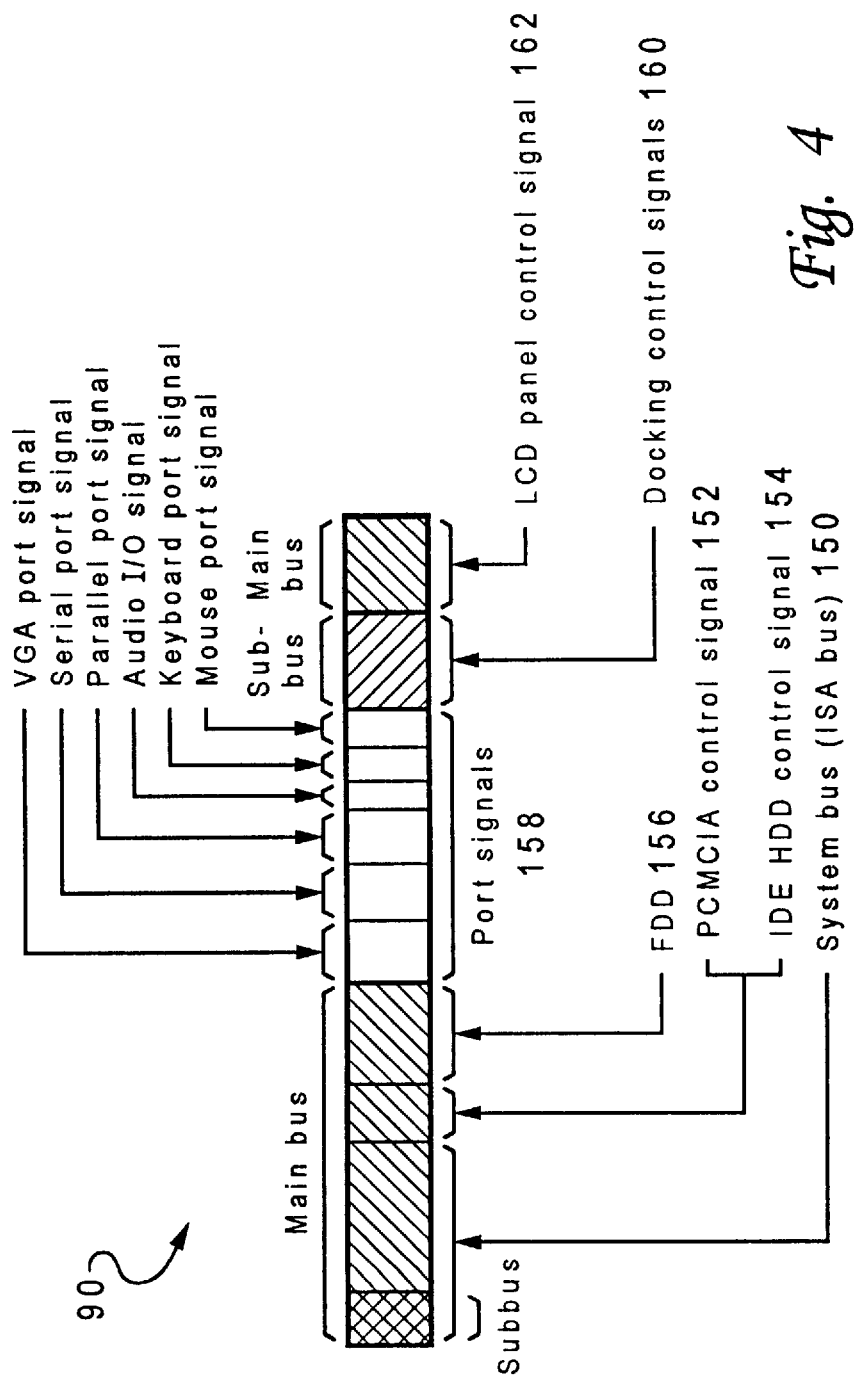
FIG. 4 schematically depicts the pin assignment of the connector for coupling the portable computer and the docking device illustrated in FIG. 1.

Portable computer 50 and docking device 60 are docked by a single connector in which all of the signals are bundled, as has already been described. Referring now to FIG. 4, there is depicted a preferred embodiment of the pin assignment of this connector. The number of pins within connector 90 is 240 in a preferred embodiment. The width of each segment of connector 90 generally represents the number of pins assigned to that segment.

As shown in FIG. 4, connector 90 includes the bus (system bus) signals 150, PCMCIA control signals 152, IDE_HDD control signals 154, FDD signals 156, port signals 158, docking control signals 160, LCD panel control signals 162, as well as other signals. System bus 33 is, in a preferred embodiment, one which utilizes the ISA standard. PCMCIA control signals 152 and IDE_HDD control signals 154 are signals which support functions other than those within the ISA standard. Port signals 158 include the serial port signal, parallel port signal, keyboard port signal, and similar signals as is also illustrated in FIG. 1. Docking control signals 160 comprise the signals for controlling the docking/undocking of docking device 60 with portable computer 50. In addition, LCD panel control signals 162 are digital video signals for driving LCD 12 from docking device 60. Signals 162 are some of the signals which cannot be connected or disconnected while active, and are thus included in main bus 33 (not illustrated in FIG. 1).

Docking control signals 160 include the signals essential for the docking/undocking operation of the preferred embodiment illustrated in FIG. 1, such as PWR_ON#, SUS_STAT#, DOCKED#, NOTE_ID0 and EVENT#. PWR_ON# represents the power-on/off state of host 50. SUS_STAS# represents the power management mode of host 50. Within docking device 60, the power supply state of host 50 determined as depicted in Table 2 according to the combination of PWR_ON# and SUS_STAS#. That is, it can be determined from PWR_ON and SUS_STAS# that host 50 is in an ordinary operation state, including a standby mode, when PWR_ON# is low and SUS_STAT# is high, a suspend mode when both PWR_ON# and SUS_STAT# are low and a complete power-off state when PWR_ON# and SUS_STAT# are high. Incidentally, PWR_ON# high and SUS_STAT# low is a combination which is unused.

TABLE 2

|  |  | PWR_ON# | |
|---|---|---|---|
|  |  | HIGH | LOW |
| SUS_STAT# | HIGH | Power-off | Power-on (ordinary operation/standby) |
|  | LOW | N/A | Suspend |

Figure 5:
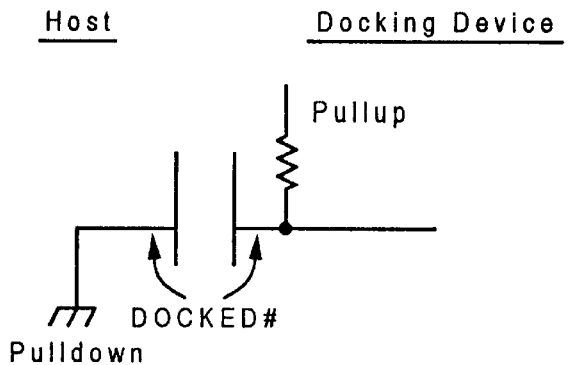
FIG. 5 illustrates the construction of the DOCKED# signal included in the connector for coupling the portable computer and the docking device represents the docking state.

DOCKED# is a signal that indicates whether portable computer 50 is docked with docking device 60. As shown in FIG. 5, since DOCKED# is pulled down within host 50 and pulled up within docking device 60, DOCKED# within docking device 60 indicates ACTIVE_LOW when host 50 and docking device 60 are docked.

Figure 6A:
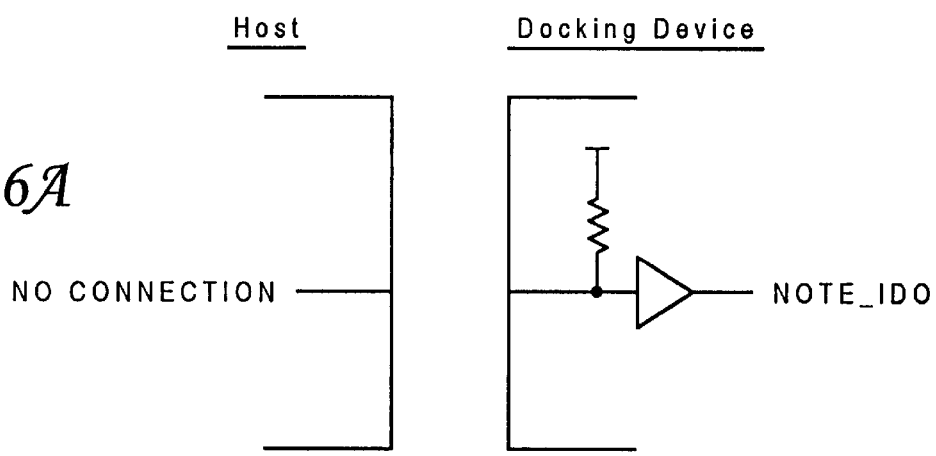
FIGS. 6A and 6B depict the construction of the NOTE_ID0 signal which indicates whether the portable computer is conventional.
Figure 6B:
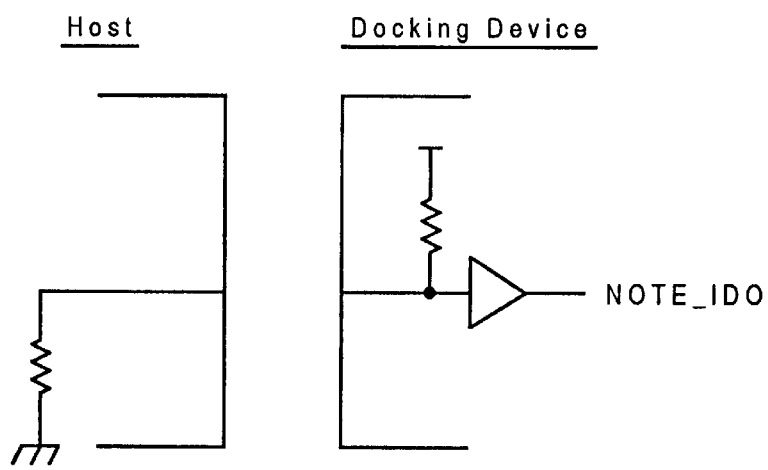

NOTE_ID0 is a signal which indicates whether host 50 is a new type of portable computer or an old type. Here, the new type means a portable computer able to communicate with docking device 60 and the old type means a conventional portable computer which does not have such a capability. The communication which host 50 performs with docking device 60 specifically means that host 50 processes the SMI issued by the interface circuit 41 and responds to docking device 60 (see sections D and E, below). If host 50 is of the new type, docking device 60 performs the operations described below in sections D and E, and, if of the old type, the operation described in sections F and G. With reference to FIGS. 6A and 6B, the specific construction of NOTE_ID0 is depicted. As illustrated in FIG. 6A, NOTE_ID0 within portable computer 50 of the old type does not have a connection relationship, and thus NOTE_ID0 within docking device 60 cannot obtain an output. On the other hand, as shown in FIG. 6B, NOTE_ID0 within portable computer 50 of the new type is pulled down, and thus NOTE_ID0 within docking device 60 can obtain ACTIVE_LOW as an output.

PWR_ON#, SUS_STAT#, DOCKED# and NOTE_ID0 are provided for sending information from host 50 to docking device 60, while EVENT# is provided to send information from docking device 60 to host 50. If an event to be reported to host 50 occurs within docking device 60, EVENT# becomes ACTIVE_LOW. In addition, CPU 42 within docking device 60 writes the content of the event which has occurred to the output register in the interface circuit 41. The notification of the event by EVENT# is processed as a software interrupt (SMI) on host 50 side. More specifically, the interrupt handler 24 always monitors EVENT#, and reports the detection of ACTIVE_LOW to BIOS 73. Then, BIOS 73 reads the output register in the interface circuit 41 in response to this notification to determine the content of the event. In particular, the event which docking device 60 wants to report to host 50 is a prior notification of docking (ABOUT_TO_DOCK) or a prior notification of undocking (ABOUT_TO_UNDOCK) (see sections D and E, below). Note that docking device 60 can utilize EVENT# on the assumption that host 50 is of the new type having the function of processing the SMI from docking device 60, as described above.

D. Docking a Portable Computer With the Docking Device

As has been described in section A with reference to FIG. 1, the port signals which can be connected or disconnected while active are mechanically and electrically connected to host 50, thereby enabling the user to use them. Bus signals are mechanically connected through the main bus isolator 31 or the subbus isolator 32 and are electrically isolated when the connector is mechanically connected. Electrical connection of bus signals is described below with reference to the flowcharts depicted in FIGS. 7–10. However, it is assumed that bus signal connection starts with power being supplied from the commercial power supply to docking device 60.

Figure 7:
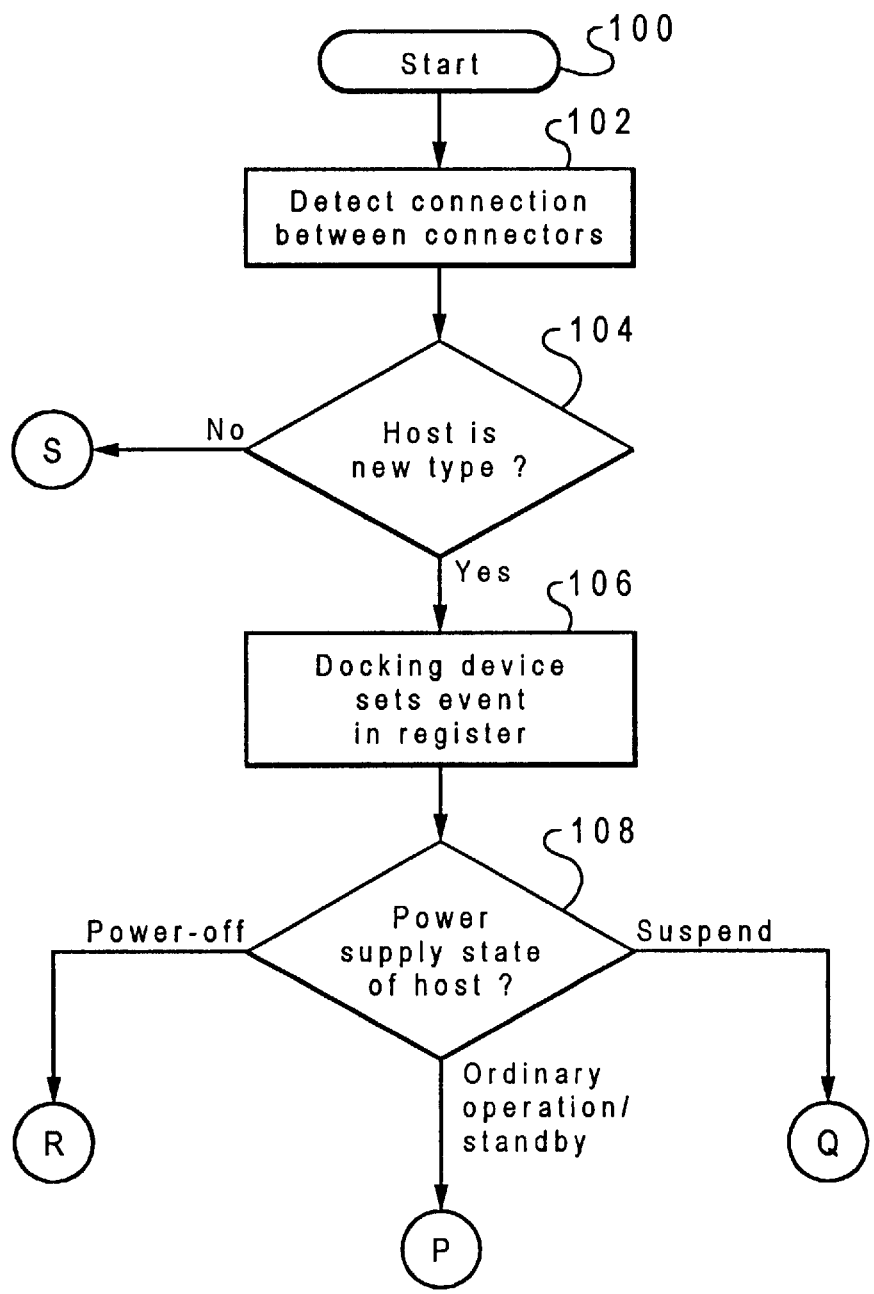
FIG. 7 is a flowchart illustrating the process of docking the portable computer (host) with the docking device.

With reference now to FIG. 7, the process begins at block 100 when the connectors for connecting host 50 and docking device 60 are mechanically coupled by the user. Since the interface circuit 41 and the CPU 42 communicating with the subbus 34 within docking device 60 are already in an operating state, the mechanical connection can be detected by a change in DOCKED# to ACTIVE_LOW as illustrated at step 102. Then, at block 104 it is determined from NOTE_ID0 whether host 50 is a new type or an old type of portable computer. If host 50 is an old type, the SMI from the docking device 60 cannot be processed as described above, and thus system bus 4 cannot be electrically connected in the same operation. Accordingly, the process branches to off-page connector S.

If at block 104 a determination is made that host 50 is of a new type, the process proceeds to block 106, which depicts CPU 42 writing "ABOUT_TO_DOCK" to the output register in the interface circuit 41 to indicate that an event has occurred. The subbus isolator 32 electrically connects the subbus 34 to the system bus 4. The subbus 34 can be connected with the system bus 4 at this point because subbus 34 can be connected or disconnected while active, unlike the main bus 33. In addition, interface circuit 41 and the CPU 42 need to communicate with host 50 after block 108.

Then, at block 108, the power supply state of host 50 is determined by PWR_ON# and SUS_STAT#. If host 50 is in an ordinary operating state the process branches to off-page connector P. In the alternative, if host 50 is in a suspend state or a power off state, the process proceeds to off-page connectors Q and R, respectively. The process branches at block 108 since:

(1) In an ordinary operating state, the bus 4 is active, whereas in a suspend state bus 4 is inactive.

(12) In a suspend state, the system configuration information of host 50 is saved in the main memory 3, whereas in a power-off state, such information is provided and no resource conflict with docking device 60 occurs at POR (Power On Reset).

Figure 8:
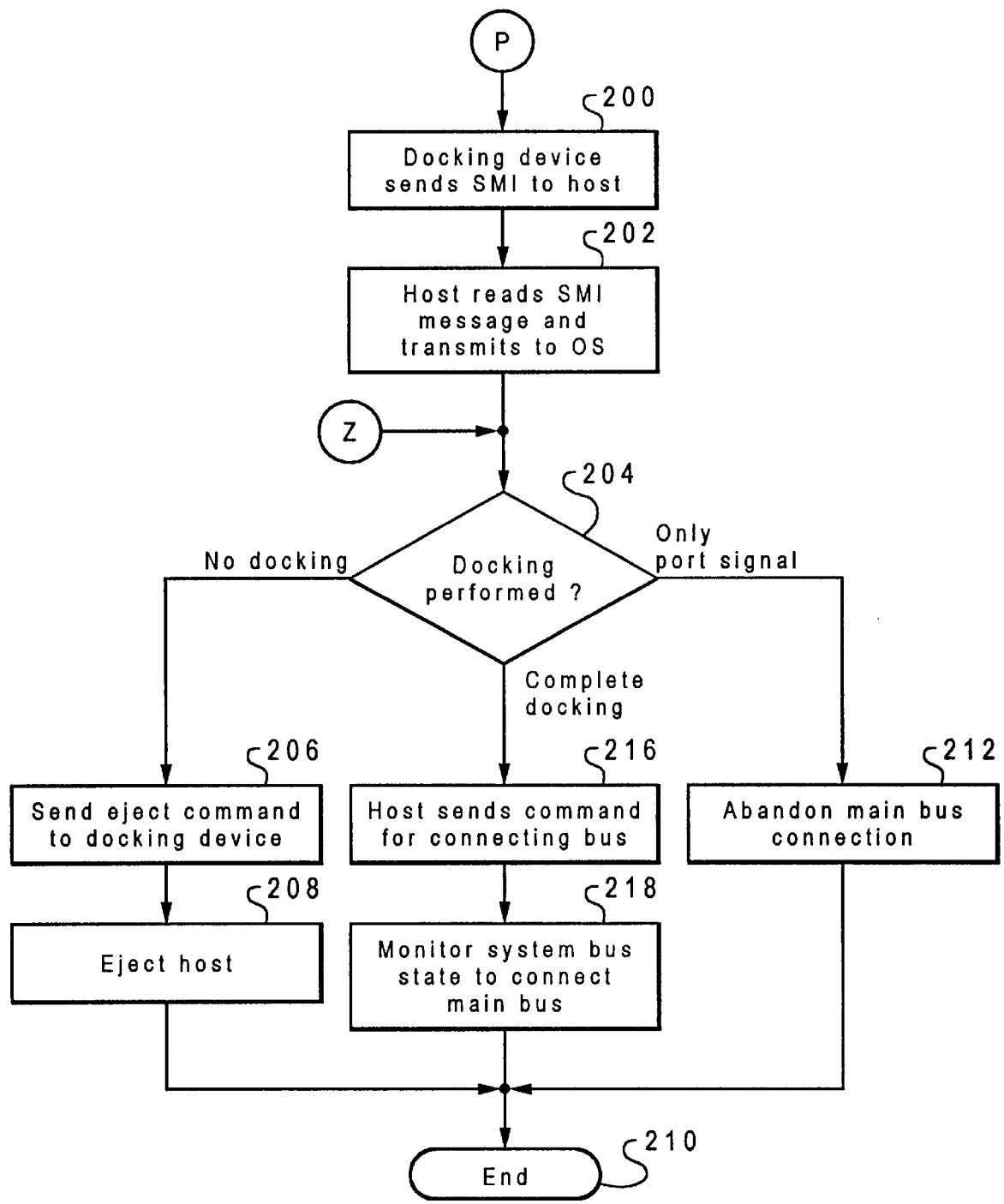
FIG. 8 is a flowchart depicting the process of docking the portable computer (host) with the docking device and, more particularly, the process of docking when the portable computer is in an ordinary operating state.

Referring now to FIG. 8, if host 50 is in an ordinary operating state, the process proceeds from on-page connector P to block 200, which illustrates interface circuit 41 issuing an SMI to host 50 by changing EVENT# to ACTIVE_LOW. Interrupt handler 24 detects the SMI and informs BIOS 73 of the SMI. Then, BIOS 73 searches for which device has sent the SMI and determines that docking device 60 is the source of the SMI. The process proceeds to block 202, which illustrates BIOS 73 reading ABOUT_TO_DOCK from the output register in the interface circuit 41 to determine if docking of host 50 is about to be performed and reporting the docking to OS 72. Also, at this point, main DC power supply 86 begins to supply power to devices coupled to main bus 33.

Next, at block 204 OS/utility 72 determines by software whether or not to actually perform docking. For instance, if the system configuration of docking device 60 conflicts with the resources already installed in host 50, the docking cannot be performed. In this case, the process proceeds to block 206, where an eject command is sent to docking device 60 to completely undock host 50. Thereafter, host 50 is ejected at block 208 and the process terminates at block 210. If, however, at block 204 OS 72 determines that partial docking can be performed, the process proceeds to block 212, which depicts abandoning the electrical connection of main bus 33 and maintaining the connection between host 50 and ports within docking device 60. In addition, the OS 72 of host 50 determines the system configuration of docking device 60 by reading the content of the EEPROM additionally provided in the CPU 42 or by reading a prestored correspondence table including the identification number and the system configuration of docking device 60.

Referring again to block 204, if it is determined that the electrical connection of main bus 33 is possible, host 50 transmits a command "connect the bus" to docking device 60 at step 216. This command is performed by writing a code 'BUS_CONNECT' to the input register in the interface circuit 41 and setting the IBF. Setting the IBF generates an interrupt in the CPU 42 and the bus connect command is recognized. CPU 42 sets the busy flag to process the 'BUS_CONNECT' command. As described above, further commands from the host cannot be accepted while the busy flag is set. Then, CPU 42 writes 'Acknowledge,' a code indicating acceptance of the command, to the output resister and sets the OBF. BIOS 73 polls the OBF and, in response to setting the OBF, reads the output register and confirms acceptance of the command by resetting the OBF.

When the CPU 42 determines through the resetting of the OBF that BIOS 73 has accepted the command, CPU 42 causes the interface circuit 41 to connect main bus 33. In particular, as illustrated at block 218, CPU 42 monitors REFRESH# of the system bus 4 and causes the connection of the main bus 33 to be carried out at the start of the refresh cycle. The connection is made at the start of the refresh cycle since the activity of system bus 4 is relatively low at this point in time and signal waveform disturbances due to the bus connection are minimized.

When electrical connection of the main bus 33 has been completed, CPU 42 writes 'CONNECTED' to the output register and sets the OBF to indicate the event transition. Then, BIOS 73 reads the output register in response to CPU 42 setting the OBF and resets the OBF. Next, CPU 42 determines from the resetting of OBF that host 50 has verified the bus connection and resets the busy flag. Thereafter, the process terminates at block 210. If host 50 is in a standby mode, the system bus 4 remains active. Thus, standby mode is included in an "ordinary operating state" in the broad sense.

Figure 9:
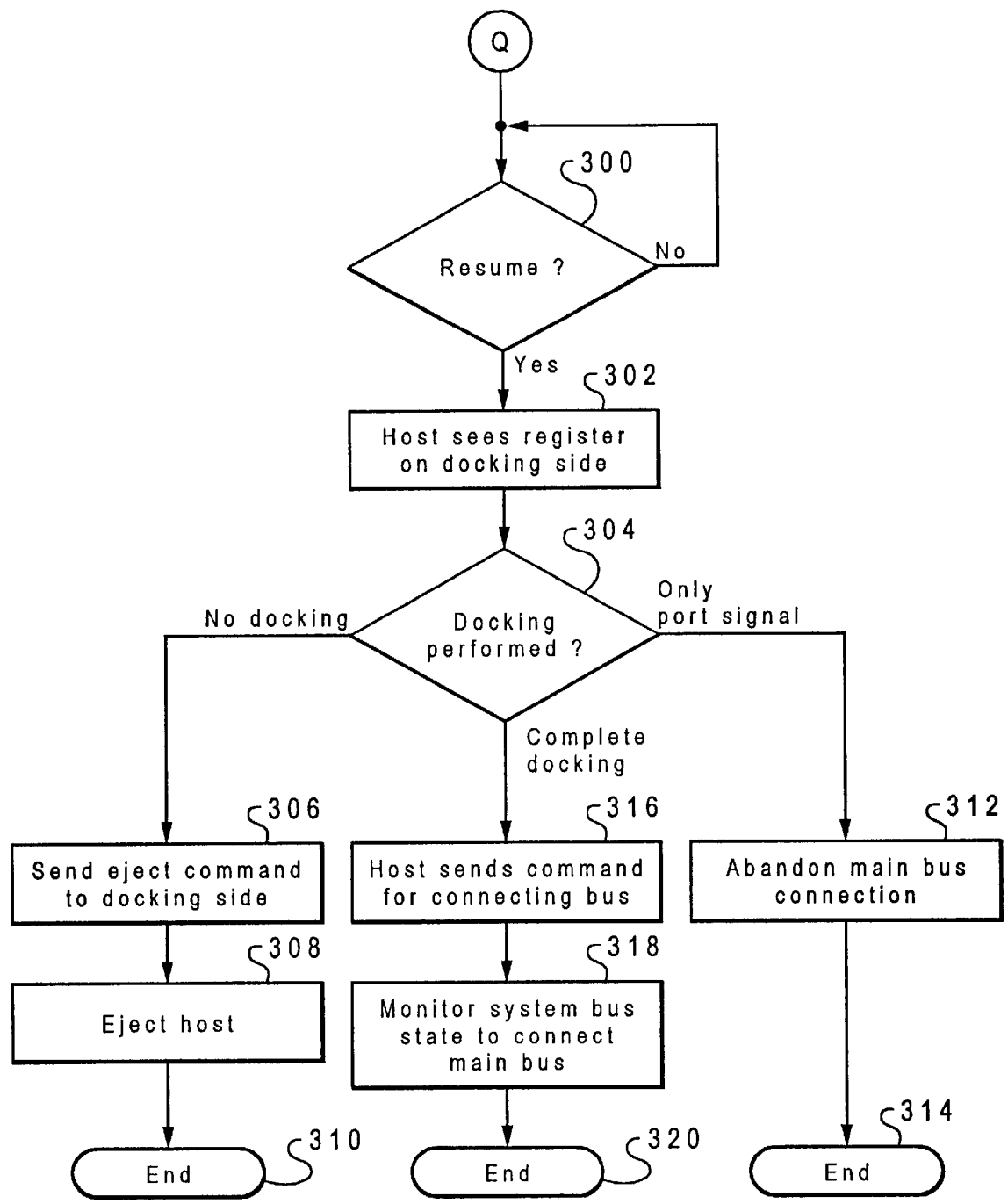
FIG. 9 is a flowchart illustrating the process docking the portable computer while the portable computer is in a suspend state.

With reference now to FIG. 9, there is illustrated the continuation of the docking process following off-page connector Q of FIG. 7. As depicted, the process proceeds from on-page connector Q decision block 300, which illustrates the process awaiting a resume command. When a resume command is received, BIOS 73 within host 50 reads the content ('ABOUT_TO_DOCK') of the output register in the interface circuit 41 and detects that a docking is about to be performed as depicted at block 302. A resume command can occur within host 50, such as a keyboard (function key) input, or can occur within docking device 60, such as the pressing of the power switch (not shown) of docking device 60. Block 302 is performed by resume code (usually loaded into the main memory 3 at initialization) within host 50 in the former case. In the latter case, resumption is triggered by the occurrence of the SMI and performed by BIOS 73. The process proceeds to block 204, which indicates connecting the main bus 33. Since blocks 204–218 were described above, the description thereof is omitted here.

Figure 10:
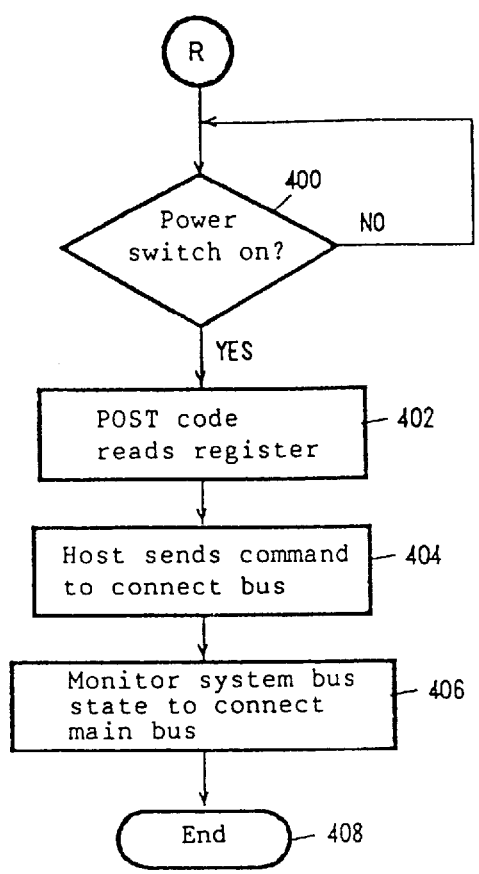
FIG. 10 is a flowchart depicting the process of docking the portable computer while the portable computer is in a power-off state.

Referring now to FIG. 10, there is depicted the continuation of the process after off-page connector R of FIG. 7. As illustrated, if host 50 is in a power-off state, the process loops at block 400 until the power supply is turned on. Then, when the power supply for the host 50 is turned on, a self-diagnostic program POST (Power-On Self-Test) is executed by host 50 at block 402. The POST code reads the content ('ABOUT_TO_DOCK') of the output register in the interface circuit 41 to detect that a docking is about to be performed. In addition, docking device 60 detects the power-on of host 50 through PWR_ON# and main DC power supply 86 starts to supply power to devices coupled to main bus 33.

If host 50 is in a power-off state, the system configuration of docking device 60 does not conflict with the resources of host 50 because the system is not installed in host 50. Consequently, when ABOUT_TO_DOCK is read at block 402, the POST code of host 50 transmits a command to connect main bus 33 (i.e., there is no step corresponding to 204). Then, at block 406, main bus 33 is connected. Since the details of connecting main bus 33 are similar to the above described steps 216 and 218, the description thereof is omitted here.

E. Undocking a Portable Computer From the Docking Device

Figure 11:
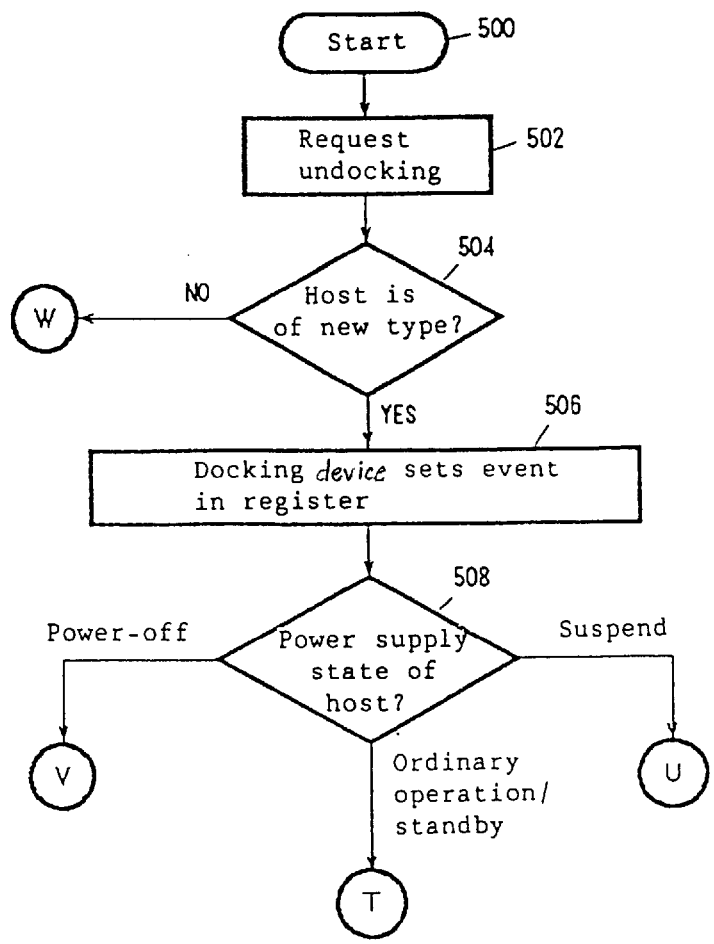
FIG. 11 is a flowchart illustrating the process of undocking the portable computer from the docking device.

With reference now to FIG. 11, the process begins at block 500 and proceeds to block 502, where a request for undocking is generated by the user pressing eject button 44 on the docking device 60 or by software executing within host 50. In the former case, CPU 42 is activated by the eject button 44 and, in the latter case, CPU 42 detects request for undocking by DOCKED#. Then, at block 504, it is determined by NOTE_ID0 whether host 50 is a new type or an old type of portable computer. If host 50 is the old type, host 50 cannot process the SMI issued by docking device 60; thus, the process proceeds from block 504 to off-page connector W.

On the other hand, if a determination is made that host 50 is a new type, the process proceeds to block 506, where 'ABOUT_TO_UNDOCK' is written to the output register in the interface circuit 41 to indicate that an undocking event has been detected. Then, the docking device 60 determines the power supply state of host 50 from PWR_ON# and SUS_STAT# at block 508. The process branches to off-page connector T when host 50 is in an ordinary operating state, to off-page connector U when host 50 is in a suspend state, and to off-page connector V when host 50 is in a power-off state.

Figure 12:
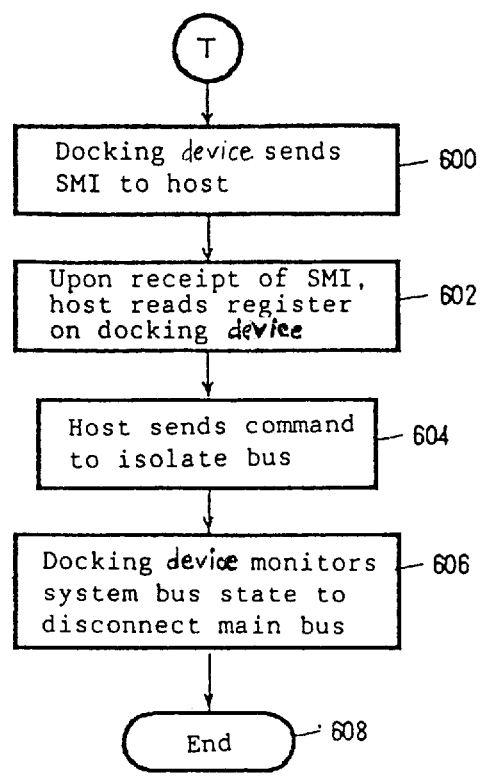
FIG. 12 is a flowchart depicting the process of undocking the portable computer while the portable computer is in an ordinary operating state.

Referring now to FIG. 12, there is depicted the undocking process subsequent to off-page connector T of FIG. 11. The process proceeds from on-page connector T to block 600, where if host 50 is in an ordinary operating state, the interface circuit 41 issues an SMI to host 50. The interrupt handler 24 detects and reports the occurrence of the SMI to BIOS 73. When BIOS 73 detects that the SMI has been issued by docking device 60, host 50 reads the content ('ABOUT_TO_UNDOCK') of the output register in the interface circuit 41 and reports to OS 72 that host 50 and docking device 60 are about to be undocked at block 602. Then, OS 72 sends a command to docking device 60 to isolate the bus at block 604. More particularly, the command is transmitted by writing a record 'BUS_DISCONNECT' to the input register in the interface circuit 41 and setting the IBF. Setting the IBF causes an interrupt to occur in CPU 42. Thereafter, CPU 42 sets the busy flag to process 'BUS_DISCONNECT'. Then, the CPU 42 writes a code "Acknowledge" indicating acceptance of the command to the output register and sets the OBF. BIOS 73 polls the OBF and reads the content of the output register in response to setting the OBF. BIOS 72 confirms that the command has been accepted by resetting the OBF. Then, at block 606 CPU 42 determines through the resetting of the OBF that the command has been accepted by host 50 and causes the interface circuit 41 to isolate main bus 33 and subbus 34. Like connection of main bus 33, isolation is performed at the start of the refresh cycle. After the isolation of the bus signals 33 and 34, host 50 may be ejected from docking device 60 by a mechanical operation. Thereafter, the process terminates at block 608.

Figure 13:
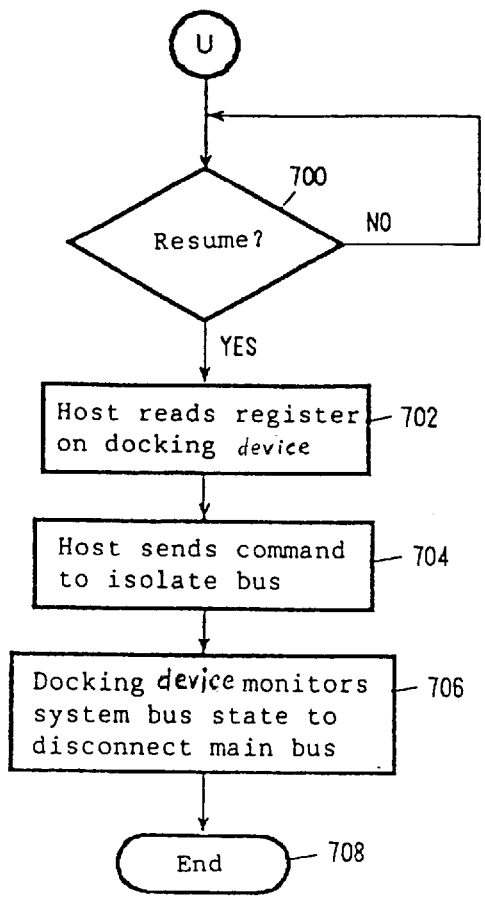
FIG. 13 is a flowchart illustrating the process of undocking the portable computer while the portable computer is in a suspend state.

With reference now to FIG. 13, there is illustrated a flowchart of the undocking process following off-page connector U of FIG. 11. The process proceeds from on-page connector V to block 700, which depicts host 50 in a suspend state waiting for a resume command. When a resume command is given, the process proceeds to block 702, where BIOS 73 reads the content ('ABOUT_TO_UNDOCK') of the output register in the interface circuit 41 to detect that undocking is about to be performed. A resume command can occur within host 50 or docking device 60, as described above in section D. Step 702 is executed by the resume code in the former case and by BIOS 73 in the latter case. Next, the process proceeds to blocks 704–708, which are substantially the same as blocks 604–608 described above. Therefore, the description thereof is omitted here.

Figure 14:
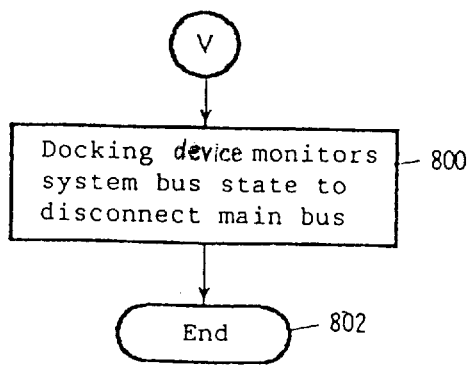
FIG. 14 is a flowchart depicting the process of undocking the portable computer while the portable computer is in a power-off state.

Referring now to FIG. 14, there is depicted the continuation of undocking process following off-page connector V of FIG. 11. Following on-page connector V, the process proceeds to block 800, which illustrates undocking of systems 50 and 60 while host 50 is in a power-off state, as is also supported by prior art systems. Accordingly, the user can freely undock systems 50 and 60. After undocking, if power is applied to host 50, POR is executed in the usual manner.

F. Docking a Conventional Portable Computer

Figure 15:
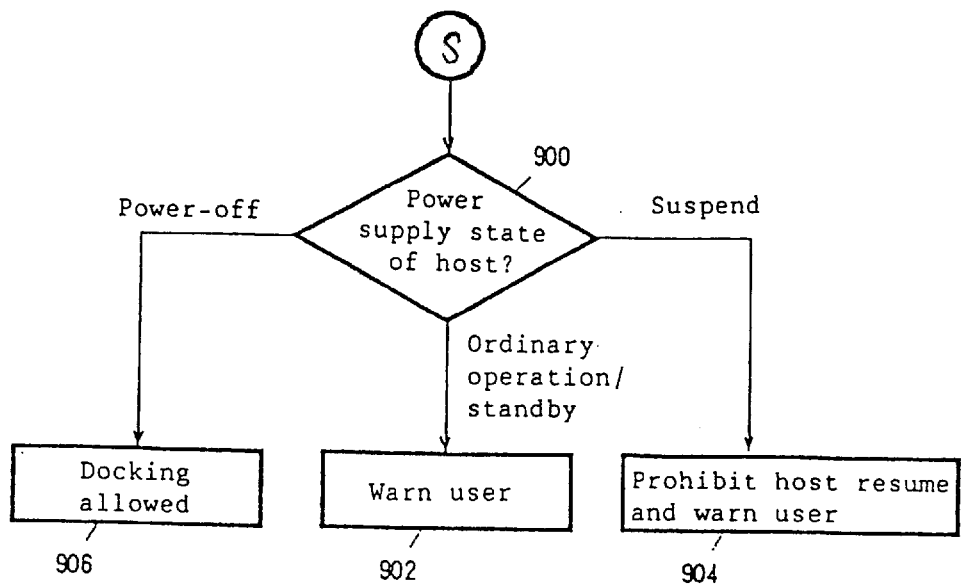
FIG. 15 is a flowchart illustrating the process of docking a conventional portable computer from the docking device of the present invention.

If host 50 is a conventional portable computer, host 50 cannot handle the SMI from docking device 60, as has been described in section C. Consequently, those skilled in the art will appreciate that operations similar to sections D and E cannot be performed by a conventional portable computer. Thus, in a preferred embodiment of the present invention, if host 50 determined to be a conventional portable computer at block 104 of FIG. 7, the docking process continues following on-page connector S in FIG. 15. At block 900, docking devices 60 determines the power supply state of host 50 from the states of PWR_ON# and SUS_STAT#. If docking is attempted when the host 50 is in an ordinary operating state, at block 902 the docking device 60 beeps to warn the user that docking is prohibited. More specifically, CPU 42 detects the attempted docking from NOTE_ID0 of DOCKED# being high and activates an alarm (not shown). However, since main bus 33 is electrically isolated by main bus isolator 31, the hardware coupled to main bus 33 cannot be electrically damaged by a sudden docking. Accordingly, the power of host 50 need not be forcibly shut down as is done by some prior art system, enabling the user can avoid the suspension of a current task by such an inadvertent docking.

Returning to block 900, if docking is attempted when host 50 is in a suspend state, the process proceeds to block 904, where docking device 60 inhibits host 50 from being resumed and beeps to warn the user that the connection is unauthorized. If at block 900, host 50 is in a power-off state, the process proceeds to block 906, which illustrates docking device 60 permitting docking, as is usually allowed even in the prior art. Accordingly, by subsequently turning on the power of host 50, docking device 60 is installed normally by OS 72, as are the other devices coupled to docking device 60.

G. Undocking a Conventional Portable Computer

Figure 16:
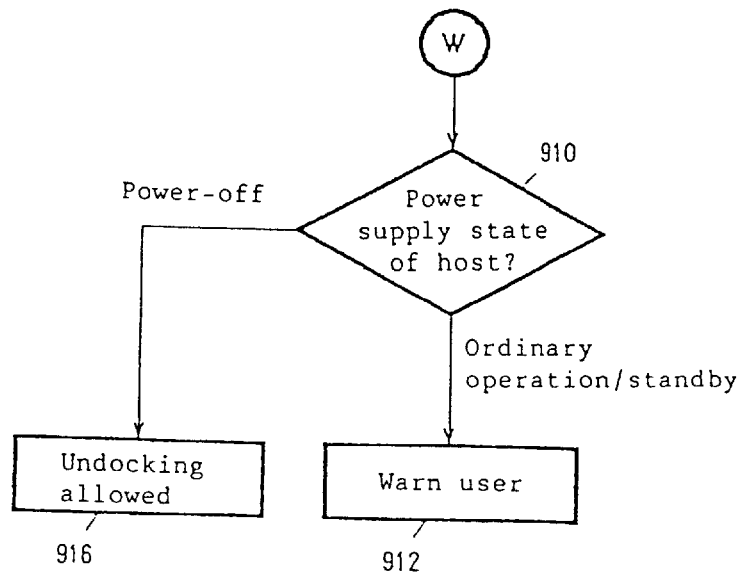
FIG. 16 is a flowchart depicting the process of undocking a conventional portable computer from the docking device of the present invention.
Figure 17:
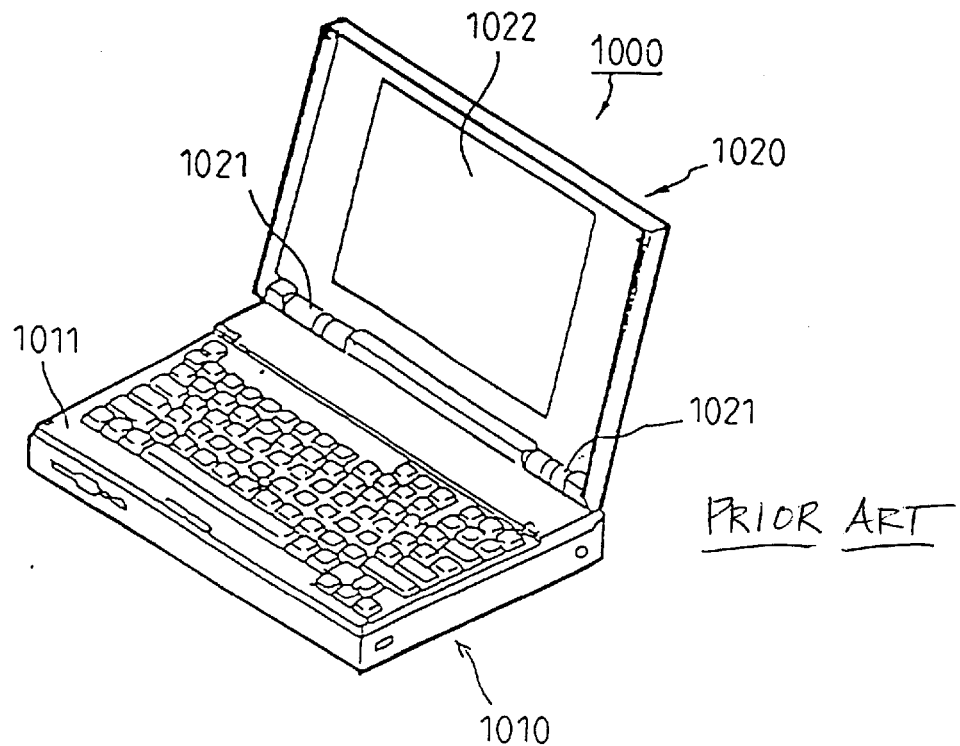
FIG. 17 is a perspective view illustrating the appearance of a conventional portable computer.
Figure 18:
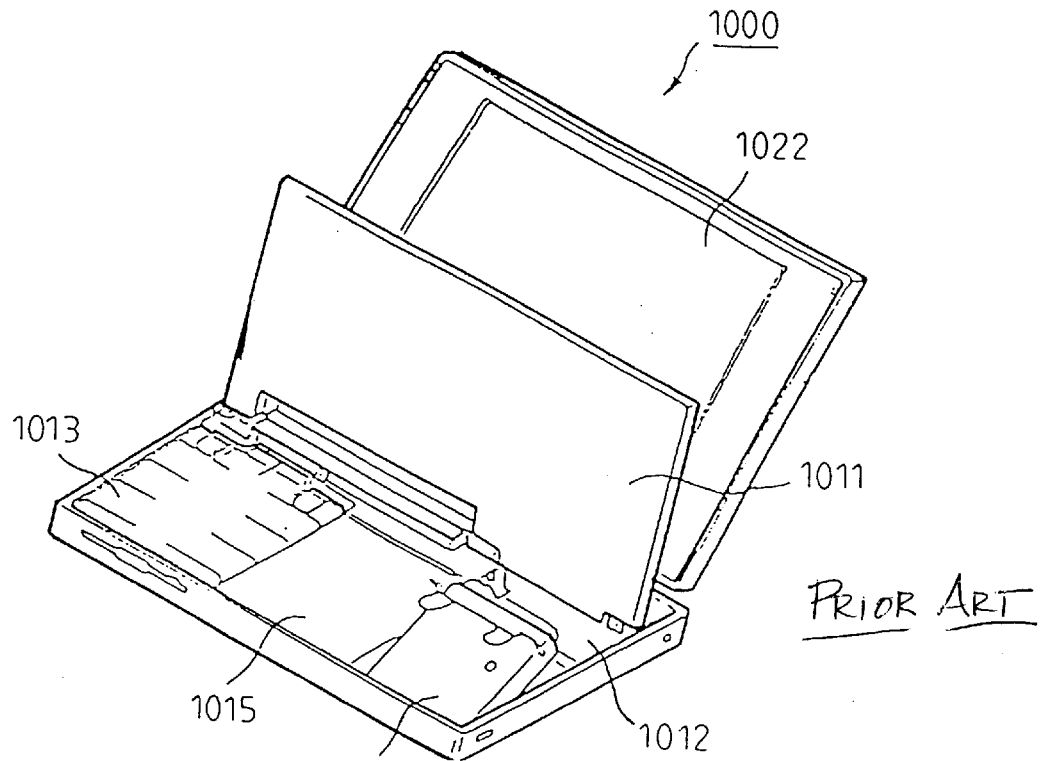
FIG. 18 depicts a perspective view of a conventional portable computer and, more particularly, depicts a state in which the inside of the main body is exposed by opening the keyboard.
Figure 19:
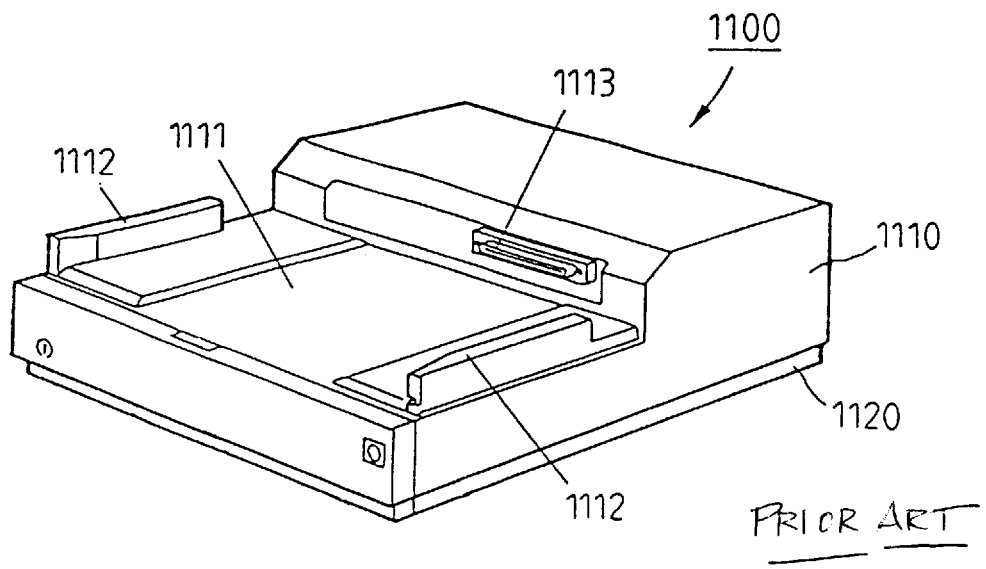
FIG. 19 illustrates a conventional docking device for a conventional portable computer.

If host 50 is a conventional portable computer, host 50 is not equipped to handle the SMI generated by docking device 60. Thus, if host 50 is determined to be a conventional portable computer at block 504 be of FIG. 11, undocking is performed as illustrated in FIG. 16. The process begins at on-page connector W and then proceeds to block 910, which depicts determining the power supply state of host 50. If undocking of host 50 and docking device 60 is attempted when host 50 is in an ordinary operating state, docking device 60 beeps to warn the user that undocking is prohibited at block 912. In addition to the warning, docking device 60 may lock the undocking of host 50 by hardware. If the undocking of host 50 and docking device 60 is attempted when host 50 is in a suspend state, docking device 60 inhibits host 50 from being resumed and beeps to warn that the undocking is unauthorized at block 904. The undocking of systems 50 and 60 when host 50 is in a power-off state is an operation which is permitted even in the prior art. Accordingly, the user can freely undock host 50 and docking device 60 at block 916. If the power of host 50 is turned on again, POR is executed in the usual manner.

As described above, the present invention provides a user-friendly docking device for a portable computer and a method for controlling the docking device. The preset invention permits a portable computer in an ordinary power-on state or a power save mode such as suspend (in other words, an active state in which the power supply to the portable computer is not completely shut down) to be docked with the docking device without a user-perceived delay in operation.

While the invention has been particularly shown and described with reference to a preferred embodiment, it will be understood by those skilled in the art that various changes in form and detail may be made therein without departing from the spirit and scope of the invention.

What is claimed is:

1. A docking device for a portable computer, said docking device comprising:

a body having one or more electronic components that are electrically connectable to said portable computer via a first plurality of signal lines;

a connector within said body, wherein said connector is mechanically connectable to a second plurality of signal lines within said portable computer; and a signal connection circuit interposed between said portable computer and said one or more electronic components, wherein said signal connection circuit selectively electrically interconnects particular ones of said first plurality of signal lines to corresponding signal lines among said second plurality of signal lines while said portable computer is in an ordinary operating state in which said second plurality of signal lines are active.

2. The docking device for a portable computer of claim 1, and further comprising:

an interface circuit that controls said selective electrical interconnection of said particular ones of said plurality of signal lines by said signal connection circuit.

3. The docking device for a portable computer of claim 2, wherein said interface circuit causes said signal connection circuit to electrically interconnect said particular ones of said first plurality of signal lines within said body to corresponding signal lines among said second plurality of signal lines within said portable computer in response to an acknowledgment by said portable computer of a request to electrically connect said particular ones of said first plurality of signal lines.

4. The docking device for a portable computer of claim 3, wherein said request to electrically connect said particular ones of said first plurality of control lines comprises a software interrupt.

5. The docking device for a portable computer of claim 2, wherein said particular ones of said first plurality of signal lines includes signal lines that transmit bus signals, and wherein said interface circuit causes said signal connection circuit to selectively electrically interconnect said particular ones of said first plurality of signal lines to corresponding signal lines among said second plurality of signal lines within said portable computer when bus traffic is relatively low.

6. The docking device for a portable computer of claim 2, wherein said signal connection circuit comprises a first bus isolator electrically coupled between said connector and said first plurality of signal lines.

7. The docking device for a portable computer of claim 6, said signal connection circuit comprising a second bus isolator electrically coupled between said interface circuit and said connector, wherein said second bus isolator selectively electrically connects said interface circuit and said connector.

8. The docking device for a portable computer of claim 2, wherein:

said docking device further comprises a processor coupled to said interface circuit; and said interface circuit includes at least one register utilized by said processor for communication with said portable computer.

9. The docking device for a portable computer of claim 1, and further comprising:

a circuit that detects mechanical interconnection of said second plurality of signal lines and said connector.

10. The docking device of claim 1, wherein said signal connection circuit selectively electrically disconnects particular ones of said first plurality of signal lines from corresponding signal lines among said second plurality of signal lines while said portable computer is in said ordinary operating state in which said second plurality of signal lines are active.

11. A method for docking a portable computer to a docking device, said docking device having one or more electronic components that are electrically connectable to said portable computer via a first plurality of signal lines, and a connector within said body that is mechanically connectable to a second plurality of signal lines within said portable computer, said method comprising:

detecting mechanical connection of said connector provided in said body and said second plurality of signal lines within said portable computer;

in response to a detection of mechanical connection between said connector and said second plurality of signal lines, transmitting to said portable computer a request to electrically connect particular ones of said first plurality of signal lines within said body to corresponding signal lines among said second plurality of signal lines within said portable computer; and in response to receipt of an acknowledgement from said portable computer of said request to electrically connect said particular ones of said first plurality of signal lines, electrically interconnecting said particular ones of said first plurality of signal lines within said body to corresponding signal lines among said second plurality of signal lines within said portable computer, such that electrical connection between said plurality of electronic components and said portable computer is achieved while said portable computer is in an ordinary operating state in which said second plurality of signal lines are active.

12. The method for docking a portable computer to a docking device of claim 11, wherein said step of transmitting a request to electrically connect said particular ones of said first plurality of signal lines comprises transmitting a software interrupt.

13. The method for docking a portable computer to a docking device of claim 11, wherein said portable computer includes a plurality of electronic components, and wherein said portable computer acknowledges said request to electrically connect said particular ones of said first plurality of signal lines only if said one or more electronic components within said docking device do not conflict with said plurality of electronic components within said portable computer.

14. The method for docking a portable computer to a docking device of claim 13, wherein said step of electrically interconnecting said particular ones of said first plurality of signal lines comprises:

monitoring signal activity in signal lines among said second plurality of signal lines within said portable computer which correspond to said particular ones of said first plurality of signal lines within said body; and electrically interconnecting said particular ones of said first plurality of signal lines within said body to corresponding signal lines among said second plurality of signal lines within said portable computer at a time of relatively low signal activity.

15. The method for docking a portable computer to a docking device of claim 11, said docking device further including a bus isolator coupled to said connector and a processor coupled to said bus isolator, said method further comprising the step of:

establishing electrical connection between said processor and said connector via said bus isolator in response to a detection of mechanical connection between said connector and said second plurality of signal lines.

16. A method of undocking a portable computer from a docking device to which said portable computer is mechanically and electrically connected, said docking device having a body adapted to receive said portable computer, said body having one or more electronic components electrically connected to said portable computer via a first plurality of signal lines, and a connector within said body that is mechanically connected to a second plurality of signal lines within said portable computer, said method comprising:

in response to a receipt of a selected input, transmitting a request to undock from one of said docking device and said portable computer to the other of said docking device and said portable computer; and in response to acknowledgement of said request by the other of said docking device and said portable computer, electrically disconnecting said first plurality of signal lines within said body from said second plurality of signal lines within said portable computer prior to mechanical disconnection of said second plurality of signal lines and said connector, wherein said portable computer can be undocked while in an ordinary operating state in which said second plurality of signal lines are active.

17. The method of claim 16, wherein said step of transmitting a request to undock comprises the step of transmitting a software interrupt.

* * * * *